March 24, 1970  A. MINCUZZI  3,502,984
ELECTRONIC REVOLUTION COUNTER WITH IMPROVED FRAME
Filed July 3, 1967  3 Sheets-Sheet 2

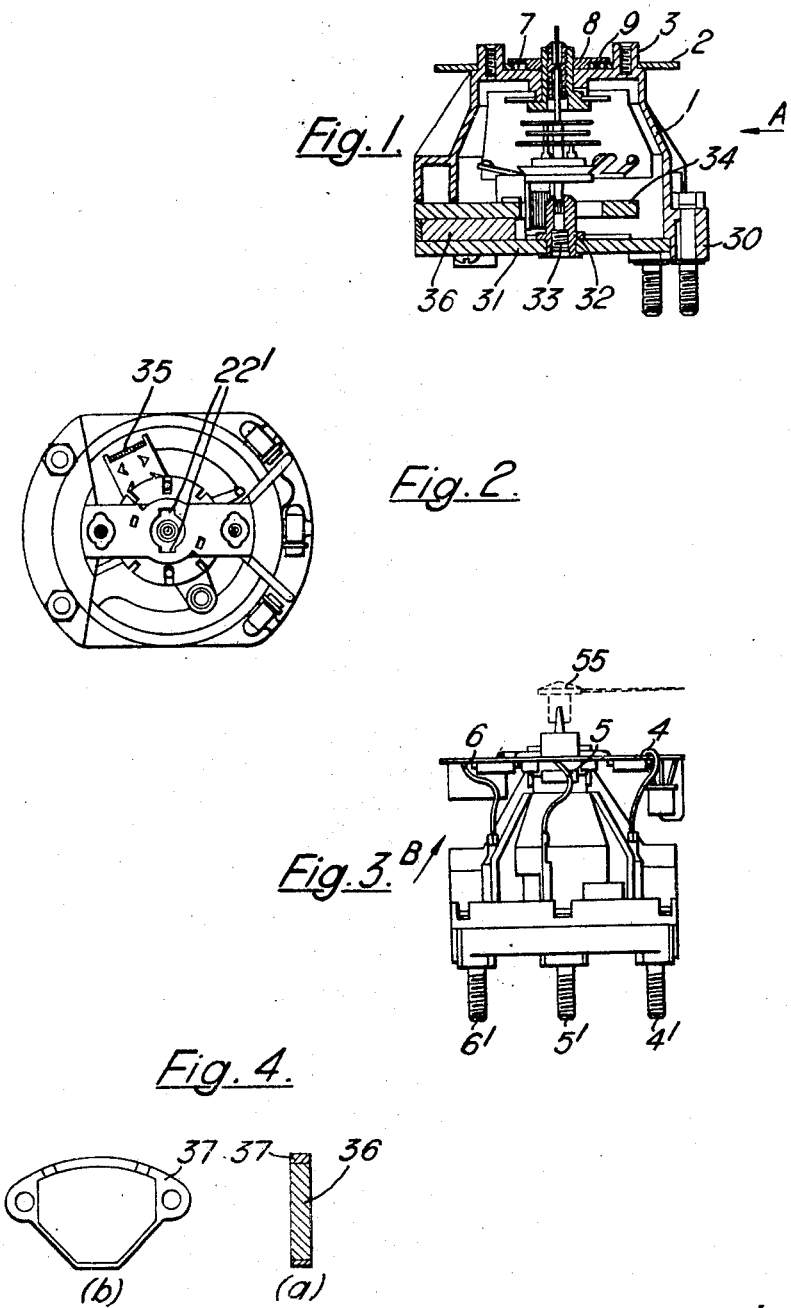

Inventor
ANTONIO MINCUZZI
By Young & Thompson
Attorneys

March 24, 1970   A. MINCUZZI   3,502,984
ELECTRONIC REVOLUTION COUNTER WITH IMPROVED FRAME
Filed July 3, 1967   3 Sheets-Sheet 3

Inventor
ANTONIO MINCUZZI
By Young & Thompson
Attorneys

United States Patent Office 3,502,984
Patented Mar. 24, 1970

3,502,984
ELECTRONIC REVOLUTION COUNTER WITH IMPROVED FRAME
Antonio Mincuzzi, Milan, Italy, assignor to Soc. per Azioni Fratelli Borletti, Milan, Italy, an Italian company
Filed July 3, 1967, Ser. No. 650,997
Claims priority, application Italy, July 2, 1966, 19,778/66
Int. Cl. G01r 1/04; G01p 1/02
U.S. Cl. 324—157                                6 Claims

ABSTRACT OF THE DISCLOSURE

An improved construction for an electronic revolution counter, particularly applicable to Otto cycle engines of motor vehicles, having a housing for a galvanometer and for a so-called "monostable multivibrator" electronic circuit controlling the galvanometer. In the improved construction said housing comprises a single, substantially frustoconical frame, with the bases of which there are associated bearing bushes supporting the spindle of the moving system of the galvanometer, a printed-circuit plate carrying said electronic circuit and a sleeve housing, one of said bushes being fixable to the upper base of the frame by the action of a single ring with a bayonet connection.

BACKGROUND OF THE INVENTION

Field of the invention

The present invention relates to an electronic revolution counter for internal combustion engines equipped with a coil-ignition circuit and having a number of cylinders and both of the two-stroke and four-stroke types, this revolution counter being applicable in particular to motor vehicles.

DESCRIPTION OF THE PRIOR ART

The instruments of this type comprise in substantially known manner a galvanometer, for example with a useful angular deflection of 250°, and an electronic circuit of the "monostable multivibrator" type in which the said galvanometer is inserted.

The electronic circuit generates a current pulse of constant duration and amplitude on each opening of the contacts of the contact breaker, the frequency of operation of the contact breaker being directly proportional to the speed of rotation of the engine. The needle of the galvanometer is therefore displaced in proportion to the frequency of the abovementioned pulses, giving an indication of the number of revolutions of the engine.

SUMMARY OF THE INVENTION

It is an object of the present invention to provide an improved construction of a revolution counter which differs from the known existing revolution counters by reason of its extremely simple and economic construction, which nevertheless provides a highly reliable performance. In particular, the aim of the present invention is to facilitate assembly, setting and calibration at the testing place in view of a mass production. This revolution counter is essentially characterised in that it comprises a single, substantially frustoconical frame with the bases of which there are associated bearing bushes supporting the spindle of the moving system, a printed-circuit plate of the electronic control circuit and a sleeve housing one of the said bushes being fixed to the upper base by the action of a single ring with a bayonet connection, and the galvanometer and the other one of the said bushes supporting the spindle of the moving system being fixed in the lower base of the frame.

The following description explains the construction of the device and enables the operation of the assembly to be better understood by reference to the accompanying drawings, in which:

BRIEF DESCRIPTION OF THE DRAWINGS

FIG. 1 is a vertical axial section of the revolution counter;
FIG. 2 is a plan view with parts removed;
FIG. 3 is an elevational view in the direction of the arrow A in FIG. 1;
FIGS. 4a and 4b show the magnet element enclosed in a frame of plastic material in which the holes for fixing the same are formed.

DESCRIPTION OF THE PREFERRED EMBODIMENTS

Figure 5:
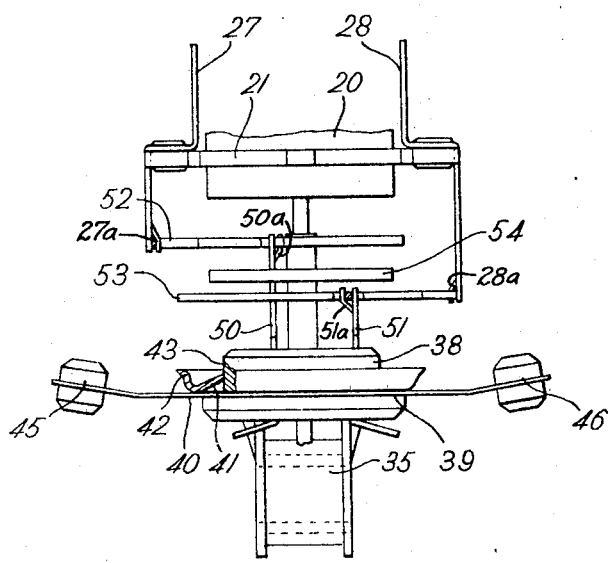
FIG. 5 shows in elevation the moving system of the revolution counter.
Figure 6:
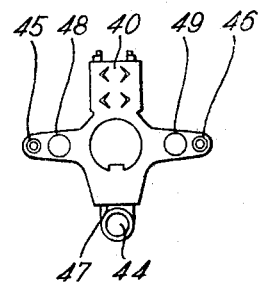
FIG. 6 is a detail of the element supporting the coil and the counterweights.
Figure 7:
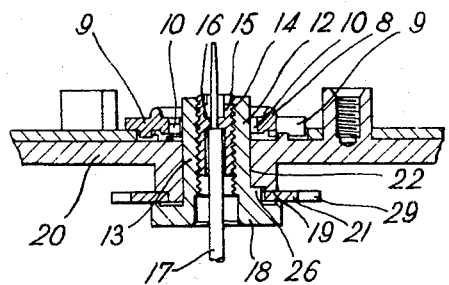
FIGS. 7 and 8 show, in vertical section and plan view, respectively, the group carrying the plate with the electronic circuit and the device for adjusting the pointer spindle and the spirals of the moving system.
Figure 8:
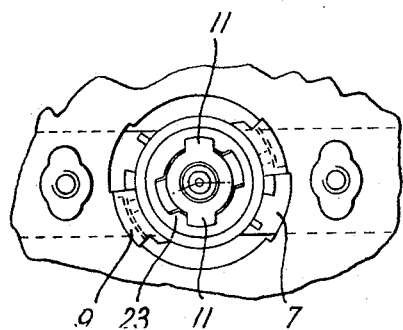

A one-piece body 1 of plastics material preferably reinforced with glass fibres for greater dimensional stability with the passage of time and obtained by injection moulding constitutes the frame on which all the elements forming the revolution counter are fixed or mounted.

Mounted in the upper portion is the plate 2 of insulating material incorporating the electronic circuit, which is of the "printed" type.

The plate 2 is fitted over, and held in position on, two projections 3 extending from the frame 1. Fixed to the plate 2, in the predetermined position of the electronic circuit, are three conductors 4, 5, 6 connected to the terminals 4', 5', 6' fast with the frame 1.

These terminals are adapted to be connected in turn to the circuit of the transmitting device (not shown), which is of known type.

Connection of the conductors 4, 5, 6 to the respective terminals 4', 5', 6' is effected by means of pin-type engaging means of known type, so that the plate 2 can be attached disengageably to the frame 1 by making the electrical connections between the said conductors 4, 5, 6 and the terminals 4', 5', 6' without using screws or soldered joints.

The plate 2 is anchored and held in position on the top face 7 of the frame 1 by two lugs or radial teeth 9 of a locking ring 8.

The ring 8 is moreover provided with two radial internal recesses 10 for the passage of two teeth 11 projecting radially from the upper part 12 of the sleeve 13; in this way the recesses 10 and the teeth 11 form a bayonet connection for the ring 8. The sleeve 13 has a threaded bore 14 into which there is screwed the bush 15, which is provided in turn with a hole 16 acting as an upper bearing for the spindle 17 of the moving system of the revolution counter.

Clamped under friction between the flange 18 of the sleeve 13 and the face 19 of the head 20 of the frame 1 is the toothed washer 21, the function of which is described hereinafter. The sleeve 13 is engaged in the hole 22 in the head 20, the hole having two vertical grooves 22' (FIG. 2) for the passage of the teeth 11 of the said sleeve.

When the sleeve 13 is fully engaged in the hole 22, the ring 8 is introduced in such maner that the two recesses 10 coincide with the teeth 11; rotation of the ring 8 through a given angle is then effected, as in a bayonet joint or connection, so that its surface 23 slides below the teeth 11, thereby locking the sleeve 13 in its seat.

The angular rotation of the ring 8 is effected in such manner that, after the said rotation, its teeth 9 are located in a position corresponding to the recesses 24 (FIG. 9) of the plate 2, so that the latter can be brought into position with the ring 8 already mounted. Once the plate 2 is also placed on the face 7, being oriented by the pins 3, a second short rotary movement, with a snap action, is imparted to the ring 8 so that the teeth 9 are superimposed on the projections 25 of the said plate 2, locking the plate in its correct position.

It will be apparent from the description given that with the ring 8 alone it is possible to lock both the sleeve 13 with the friction washer 21 and the plate 2 in the correct position.

The sleeve 13 is moreover held against rotation by the tooth 26, which engages in a cavity in the head 20.

The washer or sprocket 21 which, as has been said, is retained by friction between the sleeve 13 and the face 19 of the head 20, is provided peripherally with a series of slots 29 which serve for the initial positioning of anchoring posts 27, 28 for return spiral springs and for the consequent adjustment of the pretension of the said spiral springs during the assembly stage. The final anchoring of the posts 27, 28 to the sprocket 21 is effected by means of rivets.

Fixed in the lower part 30 of the frame 1 is the magnetic group of the galvanometer, which is constituted by a lower plate 31, to which the bush 32 supporting the spindle 17 is fixed, and an annular plate 34, on this plate 34 being slidably mounted the coil 35 of the galvanometer, so as to be free to move over an angle of about 250 degrees. Between the two plates is imprisoned the magnet element 36, which is made of sintered material (for example "Ferroxdure (II)") and mounted in a frame 37 of plastics material which enables it to be fixed.

Mounted on the spindle 17 is a hub 38 of insulating material which is shaped with two zones of different diameters. On the face 39 of the zone of larger diameter there rests the element 40, which is held in position by the opposing force due to the wedging of the teeth 41 of the cup-shaped elastic metal ring 42 against the periphery 43 of the smaller-diameter zone of the hub (see FIG. 5).

On the element 40, thus mounted on the spindle 17, is fixed the coil 35, by riveting to its support; on the same element 40 is also fixed a set of three counterweights 44, 45, 46 for balancing the movement system. This balancing is obtained by deformation or bending of the element 40 in the zones 47, 48, 49 in such manner as to move the counterweights 44, 45, 46 away from, or on the contrary bring them nearer to, the centre of rotation.

The rods 50, 51 supporting the spring spirals 52, 53 are also fixed to the hub 38. The two spirals are separated from one another by an insulating disc 54.

The anchoring of the ends of the spirals is effected by fixing them by pressure and soldering in claw-like tongues 27a, 28a, 50a and 51a formed at the ends of each of the posts 27, 28 and of the rods 50, 51, respectively. The other ends of the posts, which are electrically insulated, are fixed, as has been said, to the sprocket 21.

The assembly consisting of the two posts 27, 28, the two spirals 52, 53 and the two rods 50, 51 constitutes the double line of electrical connection between the fixed electronic circuit and the moving coil 35 of the galvanometer. If the two spirals 52, 53, owing to their axial or radial flexibility, should come into contact, there would be a short circuit in the feeder line. The insulating disc 54 prevents this. It is particularly to be noted that FIG. 5 illustrates the device with enlarged axial dimensions for the purpose of clarity, and that the two spirals 52, 53 would in fact be disposed relatively close to each other.

Fixed to the spindle 17 is the pointer 55 (partly shown in dash lines in FIG. 3), which indicates the instantaneous value of the number of revolutions on a graduated dial (not shown) which can be fixed on the projections 3.

Figure 9:
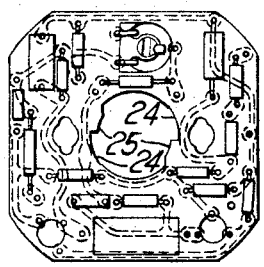
FIG. 9 shows the plate with the electronic circuit, as seen from below in the direction of the arrow B in FIG. 3.
Figure 10:
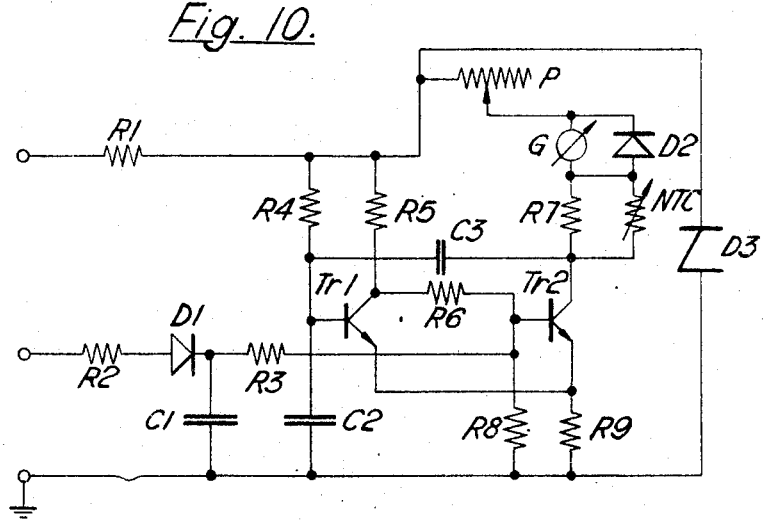
FIG. 10 shows the circuit diagram of the instrument.

FIG. 10 shows the diagram of connections of the control circuit of which FIG. 9 gives a topographical representation.

The supply voltage of the assembly is regulated through a Zener diode D3 and a drop resistor R1.

The signal coming from the ignition distributor of the motor vehicle is applied to the damping resistor R2 and is thereafter integrated through the network constituted by D1 and C1; the positive pulse obtained in this way is delivered to the base of $Tr2$ and causes the reversing of the balance of the monostable circuit $Tr1$, $Tr2$. Under these conditions, the transistor $Tr2$ becomes conductive.

In the collector circuit of $Tr2$ there is inserted the instrument G, in series with a temperature compensating circuit constituted by the parallel resistors R7 and NTC.

In series with the instrument there is moreover disposed a semi-fixed rheostat P for regulating the maximum value of the current.

This regulation is necessary for compensating for the possible differences of magnetic field and restoring torque of the spirals from one instrument to another.

After a constant time $to$ dependent on the value of C3 and R4, there is an automatic return to the stable condition of the circuit, with $Tr2$ blocked.

The electronic monostable-vibrator circuit therefore gives at its output a unidirectional current composed of rectangular pulses of constant amplitude and duration, this current supplying the moving coil of the galvanometer, which is immersed in the magnetic field created by the permanent magnet 36.

The position of equilibrium of the coil and therefore of the pointer, which are rigidly interconnected through the element 40 and the spindle 17, is tied to the effective value of the current passing through the coil. The effective value of the current depends in turn on the frequency of the pulses and therefore substantially on the number of revolutions of the engine.

What is claimed is:

1. In an electronic revolution counter having a housing for a galvanometer and for a monostable multivibrator electronic circuit for controlling the galvanometer, an improved construction comprising a single, substantially frustoconical frame having on the bases thereof bearing bushes supporting the spindle of the moving system of the galvanometer, a printed-circuit plate carrying said electronic control circuit and a sleeve housing one of the said bushes being fixed to the upper base by a single ring with a bayonet connection, and the galvanometer and the other one of the said bushes supporting the spindle of the moving system being fixed in the lower base of the frame.

2. Revolution counter as in claim 1, comprising a disc of insulating material fast with the spindle of the moving system, and two rods projecting from said disc for anchoring the inner ends of two return spiral springs controlling the oscillation of the moving system.

3. Revolution counter as in claim 2, comprising a peripherally toothed washer or sprocket clamped by friction between the said sleeve and the upper base of the frame, and two anchoring posts for the outer ends of the said spiral springs fixed to the said sprocket.

4. Revolution counter as in claim 3, wherein the said anchoring rods and the said anchoring posts each have a fastening end terminating in the claw-like tongues between which the ends of the spiral springs are secured by elastic pressure and soldering.

5. Revolution counter as in claim 1, comprising an anchoring frame of plastics material, enclosing the magnet element of the galvanometer, which is preferably made of sintered material.

6. Revolution counter as in claim 1, comprising three counterweights fixed to the ends of three radial arms of an element fast with the spindle of the moving system.

References Cited

UNITED STATES PATENTS

| | | |
|---|---|---|
| 2,983,868 | 5/1961 | Silberbach et al. |
| 2,995,706 | 8/1961 | Clarridge. |
| 3,383,587 | 5/1968 | Tripp. |

ALFRED E. SMITH, Primary Examiner

U.S. Cl. X.R.

324—70